(12) United States Patent
Saito

(10) Patent No.: US 8,902,300 B2
(45) Date of Patent: Dec. 2, 2014

(54) AUTOSTEREOSCOPIC DISPLAY APPARATUS

(71) Applicant: JVC Kenwood Corporation, Yokohama-shi, Kanagawa (JP)

(72) Inventor: Atsushi Saito, Yokohama (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 121 days.

(21) Appl. No.: 13/827,419

(22) Filed: Mar. 14, 2013

(65) Prior Publication Data
US 2013/0194398 A1    Aug. 1, 2013

Related U.S. Application Data

(63) Continuation of application No. PCT/JP2011/072608, filed on Sep. 30, 2011.

(30) Foreign Application Priority Data

Oct. 7, 2010   (JP) ................. 2010-227637

(51) Int. Cl.
| | |
|---|---|
| H04N 13/00 | (2006.01) |
| H04N 13/04 | (2006.01) |
| G03B 35/18 | (2006.01) |
| G03B 35/24 | (2006.01) |
| G02B 27/22 | (2006.01) |
| G09G 5/00 | (2006.01) |

(52) U.S. Cl.
CPC ............ *H04N 13/0404* (2013.01); *G03B 35/18* (2013.01); *G03B 35/24* (2013.01); *H04N 13/0415* (2013.01); *G02B 27/2214* (2013.01)
USPC .............................................. 348/51; 348/52

(58) Field of Classification Search
CPC .......... H04N 13/0497; H04N 13/0404; H04N 13/0409; H04N 13/0422; G02B 27/2214
USPC ........................................................... 348/51
See application file for complete search history.

(56) References Cited

U.S. PATENT DOCUMENTS 6,064,424 A * 5/2000 van Berkel et al. ............. 348/51
6,600,144 B2 * 7/2003 Matthies .................... 250/208.1
(Continued)

FOREIGN PATENT DOCUMENTS

JP   09-236777 A1   9/1997
JP   2005-509901 A1   4/2005
(Continued)

*Primary Examiner* — Sath V Perungavoor
*Assistant Examiner* — Howard D Brown, Jr.
(74) *Attorney, Agent, or Firm* — Nath, Goldberg & Meyer; Jerald L. Meyer

(57) ABSTRACT

An autostereoscopic display apparatus includes a two-dimensional display including color subpixels arranged in horizontal and vertical directions, cylindrical lenses configured to observe the color subpixels therethrough, a temperature sensor measuring an ambient temperature of the cylindrical lenses, and a parallax image changer changing the parallax images based on the measured ambient temperature. px is a horizontal pixel pitch. py is a vertical pixel pitch. Lx is a horizontal lens pitch. θ is an inclined angle of boundaries of the cylindrical lenses to the vertical direction. Ax and Ay are relatively prime natural numbers. Ax is equal to or larger than two. Bx is a minimum natural number by which a value GF indicated in the formula (2) represents an integer value. px, py, Lx and θ satisfy relational expressions represented by the formula (1) to the formula (3).

$$\theta = \arctan\{(Ax \cdot px)/(Ay \cdot py)\} \quad (1)$$

$$GF = Bx \cdot Lx/px \quad (2)$$

$$Ay \geq Bx \geq 2 \text{ and } Ax \geq 2 \quad (3)$$

11 Claims, 13 Drawing Sheets

(56) References Cited

U.S. PATENT DOCUMENTS

| | | | |
|---|---|---|---|
| 6,825,985 B2* | 11/2004 | Brown et al. | 359/619 |
| 6,859,240 B1* | 2/2005 | Brown et al. | 349/15 |
| 6,974,216 B2* | 12/2005 | Pezzaniti | 353/7 |
| 8,049,772 B2* | 11/2011 | Lipton et al. | 348/42 |
| 2002/0036648 A1 | 3/2002 | Putilin | |
| 2004/0223218 A1 | 11/2004 | Putilin et al. | |
| 2004/0227992 A1 | 11/2004 | Putilin et al. | |
| 2005/0146787 A1 | 7/2005 | Lukyanitsa | |
| 2007/0188517 A1* | 8/2007 | Takaki | 345/613 |
| 2013/0208020 A1* | 8/2013 | Jung et al. | 345/690 |
| 2013/0208357 A1* | 8/2013 | Saito | 359/463 |

FOREIGN PATENT DOCUMENTS

| | | |
|---|---|---|
| JP | 2005-309374 A1 | 11/2005 |
| JP | 2006-048659 A1 | 2/2006 |
| JP | 2008-067095 A1 | 3/2008 |
| JP | 2009-510489 A1 | 3/2009 |
| WO | 2005/093494 A1 | 10/2005 |

* cited by examiner

FIG. 9
| | SYMBOL | VALUE | UNIT |
|---|---|---|---|
| CONSTANT | $\delta$ | 7.625 | |
| HORIZONTAL PIXEL PITCH | px | 0.1 | mm |
| VERTICAL PIXEL PITCH | py | 0.3 | mm |
| INCLINED ANGLE | $\theta$ | 11.77 | ° |
| LENS PITCH | L | 0.779 | mm |
FIG. 10
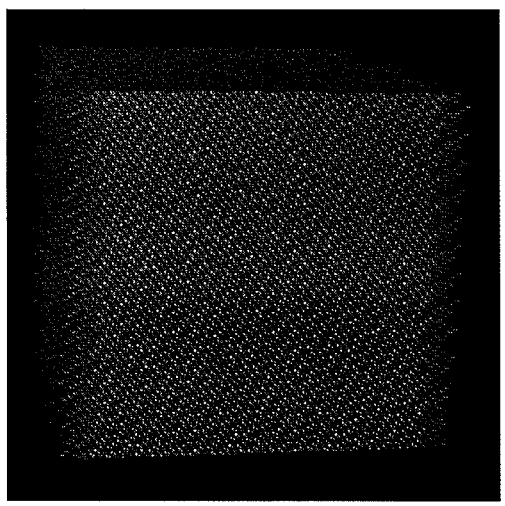
(a)
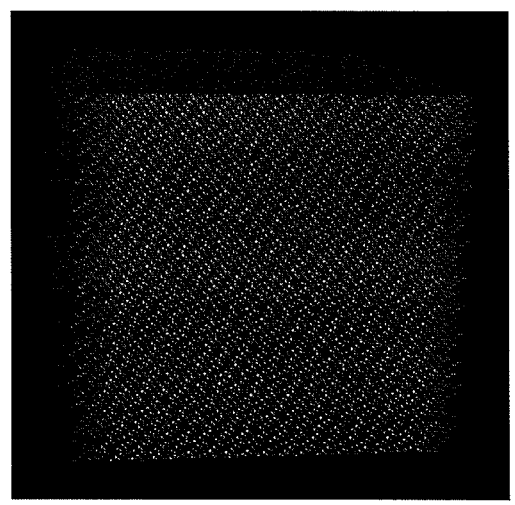
(b)

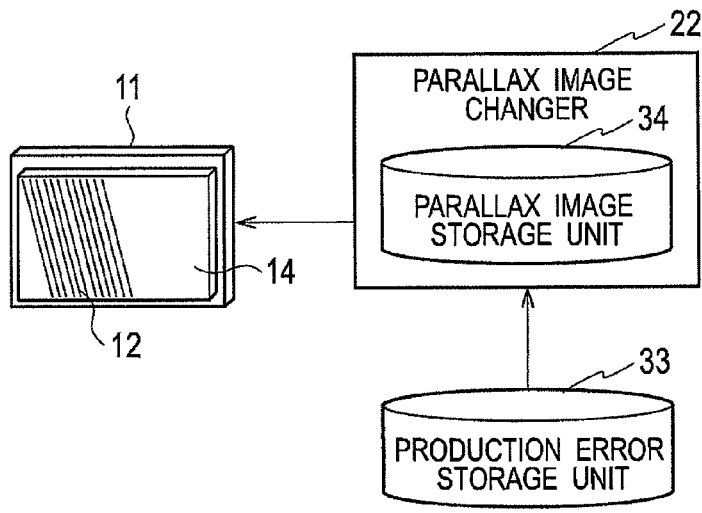

(b)

|  |  | ΔL[μm] | | |
|---|---|---|---|---|
|  |  | LESS THAN -0.5μm | FROM -0.5μm TO +0.5μm | MORE THAN +0.5μm |
| Δθ[°] | LESS THAN -0.05 | PARALLAX IMAGE S1 | PARALLAX IMAGE S2 | PARALLAX IMAGE S3 |
|  | FROM -0.05 TO +0.05 | PARALLAX IMAGE S4 | PARALLAX IMAGE S5 | PARALLAX IMAGE S6 |
|  | MORE THAN +0.05 | PARALLAX IMAGE S7 | PARALLAX IMAGE S8 | PARALLAX IMAGE S9 |

(c)

|  | LENS PITCH | INCLINED ANGLE |
|---|---|---|
|  | L[μm] | θ[°] |
| PARALLAX IMAGE S1 | 0.778 | 11.67 |
| PARALLAX IMAGE S2 | 0.779 | 11.67 |
| PARALLAX IMAGE S3 | 0.780 | 11.67 |
| PARALLAX IMAGE S4 | 0.778 | 11.77 |
| PARALLAX IMAGE S5 | 0.779 | 11.77 |
| PARALLAX IMAGE S6 | 0.780 | 11.77 |
| PARALLAX IMAGE S7 | 0.778 | 11.87 |
| PARALLAX IMAGE S8 | 0.779 | 11.87 |
| PARALLAX IMAGE S9 | 0.780 | 11.87 |

(a)

(b)

| L'<L1 | L1≤L'<L2 | L2≤L' |
|---|---|---|
| PARALLAX IMAGE S1 | PARALLAX IMAGE S2 | PARALLAX IMAGE S3 |

FIG. 16
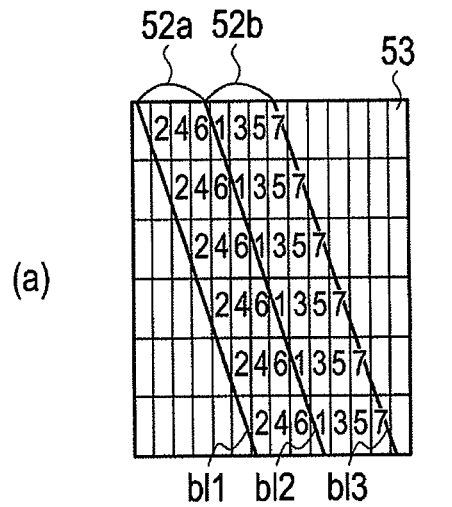
(a)
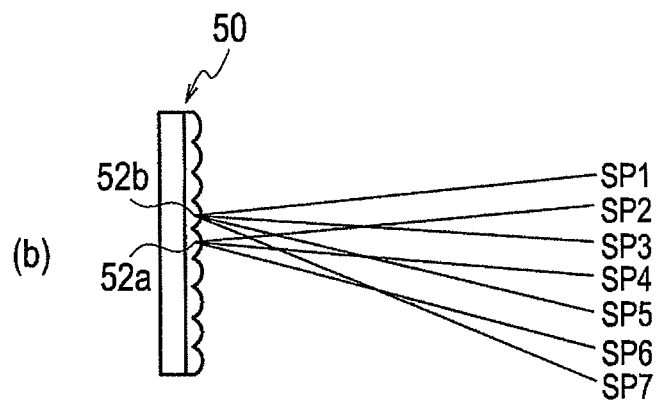
(b)
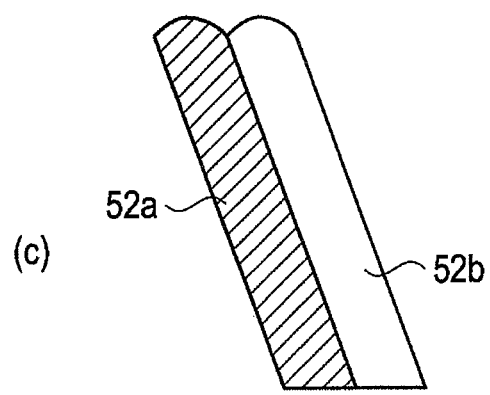
(c)

FIG. 17
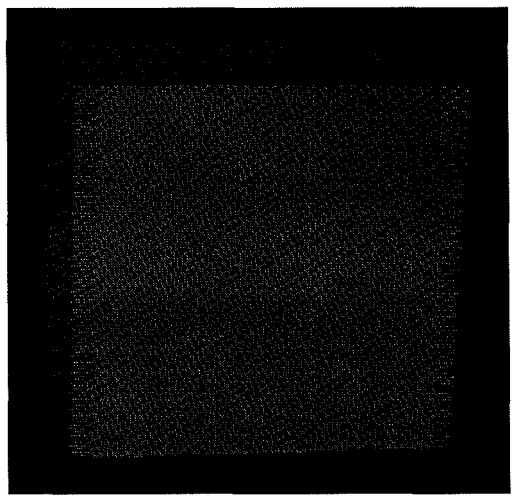 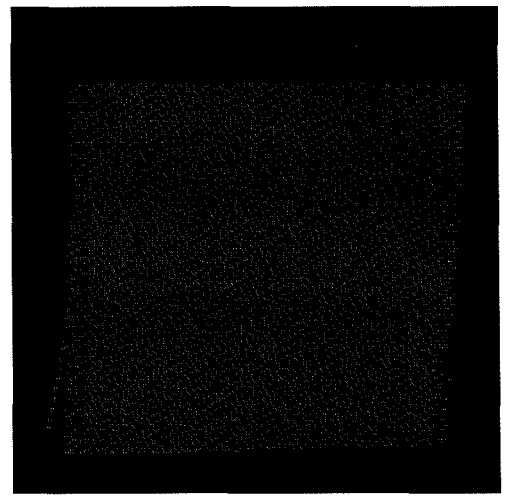
(a)                          (b)

AUTOSTEREOSCOPIC DISPLAY APPARATUS

CROSS REFERENCE TO RELATED APPLICATION

This application is a Continuation of PCT Application No. PCT/JP2011/072608, filed on Sep. 30, 2011, and claims the priority of Japanese Patent Application No. 2010-227637, filed on Oct. 7, 2010, the contents of both of which are incorporated herein by reference.

BACKGROUND

The present invention relates to an autostereoscopic display apparatus by use of a parallax in a one-dimensional direction.

There are conventionally-known methods for displaying different images depending on viewing positions by segmenting an image in a display apparatus such as a printing surface and a liquid crystal panel in multiple viewing directions by use of particular optical members, for example, lenticular lenses, slit-type barriers and lens arrays. In particular, different display images (parallax images) having a particular parallax with respect to an identical object are configured to be input to the respective right and left eyes. Accordingly, a stereoscopic image display apparatus capable of stereoscopic viewing without eyeglasses (hereinafter, referred to as "an autostereoscopic display apparatus") is realized. Note that, in the present application, a direction to segment an image in a display apparatus into parallax images is principally one dimension in a horizontal direction.

In the case of carrying out stereoscopic viewing by use of an autostereoscopic display apparatus, an image in the display apparatus is required to be segmented into parallax images in many directions as much as possible to increase viewpoints, so as to extend a viewing range capable of stereoscopic viewing, and so as to achieve a natural stereoscopic effect and smooth motion parallax for allowing for long hours of viewing.

In recent years, applications of stereoscopic viewing by use of parallax images to digital signage, car navigation systems and the like are being considered for eye catching and visual recognition improvement. In order to achieve such applications, even when a low-resolution display apparatus is used, an image in the display apparatus is required to be segmented into parallax images as finely as possible to carry out natural stereoscopic viewing.

As a measure of such a requirement, segmenting a viewpoint as finely as possible is an effective way so that a viewer can view any of the segmented viewpoints (a multi-view system), rather than segmenting the viewpoint while assuming a location of the eyes of the viewer in space. In order to increase the segmentation number of the parallax images, increasing a lens pitch with respect to a pixel pitch of the display apparatus is effective. However, in this case, resolution of the parallax images in a lens pitch direction is significantly reduced since color subpixels are magnified due to a magnification effect of lenses in proportion to the increase of the lens pitch. As a result, a problem of a difference in resolution between a horizontal direction and a vertical direction is caused.

In Patent Document 1 (Japanese Patent Unexamined Publication No. 09-236777), lenticular lenses are inclined with respect to a pixel array so as to compose one three-dimensional pixel by use of subpixels in a vertical direction in addition to subpixels in a horizontal direction. Patent Document 1 has reported that a reduction in resolution of a three-dimensional view is thus prevented, and the balance of the resolutions in the horizontal direction and in the vertical direction can be improved.

In view of coexistence with a two-dimensional view and a matter of cost, an autostereoscopic display apparatus is being required, which uses a widely prevalent display apparatus including color subpixels of R (red), G (green) and B (blue) in which the color subpixels of each color are orderly arranged in a vertical direction.

Patent Documents 2 (Japanese Patent Unexamined Publication No. 2005-309374) and 3 (Japanese Patent Unexamined Publication No. 2006-048659) teach an equal arrangement of color subpixels of each of three colors in each line in a horizontal direction while focusing on an inclined angle of lenticular lenses with respect to a display apparatus. It has been reported that unevenness of color and luminance can be decreased due to such a constitution even when using a display apparatus in which color subpixels of different colors, for example, color subpixels of respective R (red), G (green) and B (blue) different in a horizontal direction are arranged in rows in a vertical direction in a stripe state. In addition, FIG. 1 of Patent Document 2 shows a constitution in which a lens pitch of the lenticular lenses is 7/2 of a pixel pitch so that seven segmented parallax images are arranged across two lenses in the horizontal direction. Therefore, when the lens pitch is deviated from the integral multiple of the pixel pitch, a fine segmentation of the parallax images in multiple directions can be achieved even if the lens pitch is small. Accordingly, it is possible to deal with the problem and requirement described above.

SUMMARY

However, there has been a problem of generation of oblique line noise parallel to lens boundaries as described below since the segmented parallax images are arranged across the several lenses when the lens pitch in the horizontal direction is deviated from the integral multiple of the pixel pitch.

FIG. 16(a) shows a relative positional relationship between an arrangement pattern (rectangle) of color subpixels 53 and lenticular lenses 52a and 52b provided in a display apparatus, in which the diagonal lines represent boundaries bl1 to bl3 of the lenticular lenses 52a, 52b, . . . adjacent to each other. The numbers indicated in each subpixel 53 (1 to 7) represent the numbers of parallax images, which correspond to the display directions of the parallax images segmented in a horizontal direction. FIG. 16(b) shows an autostereoscopic display apparatus 50, the directions of parallax images SP1 to SP7, and the corresponding lenticular lenses 52a and 52b.

A horizontal lens pitch is 7/2 of a horizontal pixel pitch in FIG. 16. The lenticular lens 52a corresponds to the parallax images SP2, SP4 and SP6, and the lenticular lens 52b corresponds to the parallax images SP1, SP3, SP5 and SP7. Namely, the segmented parallax images SP1 to SP7 are arranged across the two lenticular lenses 52a and 52b. As viewed through the lenticular lenses 52a and 52b, the color subpixels 53 corresponding to the respective parallax images are visually enlarged and maximized in the lens pitch in the lens pitch direction. Therefore, when observing the parallax image SP1, as shown in FIG. 16(c), the color subpixel 53 corresponding to the parallax image SP1 is not shown in the lenticular lens 52a, but shown in the lenticular lens 52b. Thus, although the parallax image SP1 can be viewed through the lenticular lens 52b, the parallax image SP1 cannot be viewed through the lenticular lens 52a.

As a result, oblique line noise parallel to the boundaries bl1 to bl3 of the lenticular lenses 52a and 52b is caused in the entire parallax view. In practice, an intermediate image of the parallax image SP7 and the parallax image SP2 is slightly viewed through the lenticular lens 52a. However, if the parallax image SP1, the parallax image SP2 and the parallax image SP7 have different corresponding color subpixels, oblique line noise is caused. Further, when the segmented parallax images are arranged across multiple lenticular lenses, the lenticular lenses in which there is no corresponding color subpixel and through which the parallax images are not viewed are increased. As a result, oblique line noise is caused more significantly.

Here, it may be possible to obtain fine parallax images without line noise by designing an inclined angle of lenticular lenses with respect to a display apparatus properly and composing color subpixels and the lenticular lenses as designed. However, even in such a case, a relative position between the lenticular lenses and the subpixels is changed from an initial value if, for example, the lenticular lenses are contracted or expanded because of a change in ambient temperature or there are production errors. The change of the relative position causes line noise when parallax images are reconstructed according to the change.

FIG. 17(a) shows a simulation image when observing parallax images from one particular point. Here, an inclined angle of lenticular lenses in this case is set to 9.46°, and a lens pitch in a horizontal direction is set to eight times of a pixel pitch. FIG. 17(b) shows an image, in a similar manner to FIG. 17(a), obtained by reconstructing parallax images in consideration of expansion of lenticular lenses when a lens pitch is expanded by 0.5% because of a change in temperature. As shown in FIG. 17(b), oblique line noise is observed after the reconstruction, which was not recognized before the reconstruction (FIG. 17(a)).

The present invention has been made in view of the above-described problems. The present invention relates to an autostereoscopic display apparatus for displaying an image segmented into plural parallax images in a horizontal direction, the apparatus including a two-dimensional display including color subpixels that are arranged in a horizontal direction and in a vertical direction, respectively, and a plurality of cylindrical lenses provided on the two-dimensional display to observe the color subpixels therethrough, and arranged parallel to each other. When a pixel pitch of the color subpixels in the horizontal direction is defined as px, a pixel pitch of the color subpixels in the vertical direction is defined as py, a lens pitch of the cylindrical lenses in the horizontal direction is defined as Lx, an inclined angle of boundaries of the cylindrical lenses to the vertical direction is defined as θ, Ax and Ay are relatively prime natural numbers, Ax is equal to or larger than two, and Bx is a minimum natural number by which a value GF indicated in the formula (2) represents an integer value, px, py, Lx and θ satisfy relational expressions represented by the formula (1) to the formula (3).

$$\theta = \arctan\{(Ax \cdot px)/(Ay \cdot py)\} \quad (1)$$

$$GF = Bx \cdot Lx/px \quad (2)$$

$$Ay \geq Bx \geq 2 \text{ and } Ax \geq 2 \quad (3)$$

The autostereoscopic display apparatus of a first aspect further includes a temperature sensor that measures an ambient temperature of the cylindrical lenses, and a parallax image changer that changes the parallax images based on the ambient temperature measured by the temperature sensor.

The autostereoscopic display apparatus of a second aspect further includes a production error storage unit that stores a production error of the lens pitch of the cylindrical lenses and a production error of the inclined angle of the boundaries of the cylindrical lenses, and a parallax image changer that changes the parallax images based on the production errors stored in the production error storage unit.

The autostereoscopic display apparatus of a third aspect further includes a distance measuring unit that measures a distance between the cylindrical lenses and a viewer; and a parallax image changer that changes the parallax images based on the distance measured by the distance measuring unit.

The autostereoscopic display apparatus of a fourth aspect further includes a parallax image selector that accepts parallax images selected by a viewer among plural kinds of parallax images constructed based on plural lens pitches of the cylindrical lenses and plural inclined angles of boundaries of the cylindrical lenses, a lens parameter storage unit that stores the lens pitch and the inclined angle corresponding to the parallax images accepted by the parallax image selector, and a parallax image changer that changes the parallax images based on the lens pitch and the inclined angle stored in the lens parameter storage unit.

BRIEF DESCRIPTION OF THE DRAWINGS

FIG. 9 is a table showing preconditions of each parameter of the autostereoscopic display apparatus of FIG. 8.

FIG. 10 shows simulation images when observing 61 segmented parallax images from a particular point through cylindrical lenses 12. FIG. 10(a) shows an image before reconstruction, and FIG. 10(b) shows an image after reconstruction.

FIG. 11(a) is a block diagram showing an entire constitution of an autostereoscopic display apparatus according to a second embodiment of the present invention, FIG. 11(b) is a table showing a relationship between parallax images and production errors stored in a parallax image storage unit 34 shown in FIG. 11(a), and FIG. 11(c) is a table showing parameters of cylindrical lenses 12 that are used when generating each of parallax images S1 to S9 in FIG. 11(*b*).

FIG. 16(*a*) to FIG. 16(*c*) are views explaining a cause of oblique line noise parallel to boundaries bl1 to bl3 of lenticular lenses 52*a* and 52*b*.

FIG. 17(*a*) is a perspective view showing parallax images before reconstruction in which oblique line noise is not caused, and FIG. 17(*b*) is a perspective view showing parallax images after reconstruction in which oblique line noise is caused.

DETAILED DESCRIPTION

Figure 1:
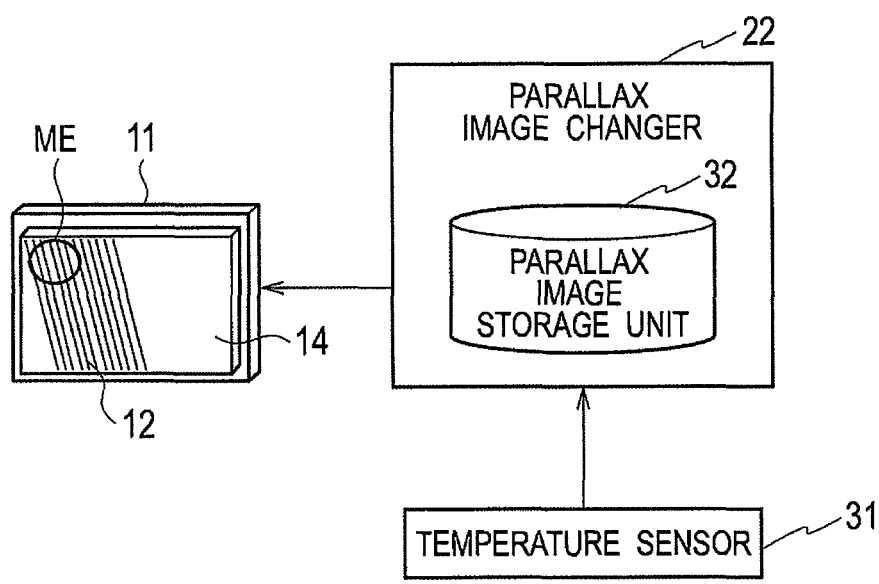
FIG. 1(a) is a block diagram showing an entire constitution of an autostereoscopic display apparatus according to a first embodiment of the present invention.
FIG. 1(b) is a table showing a relationship between parallax images S1 to S3 and a temperature range stored in a parallax image storage unit 32 shown in FIG. 1(a).

Hereinafter, embodiments according to the present invention will be explained with reference to the drawings. Note that the same elements in the drawings are indicated by the common reference numerals.

First Embodiment

<Constitutions of Two-Dimensional Display 11 and Lenticular Sheet 14>

A constitution of an autostereoscopic display apparatus according to a first embodiment of the present invention will be explained with reference to FIG. 1(*a*) and FIG. 1(*b*). The autostereoscopic display apparatus according to the first embodiment includes a two-dimensional display 11 including color subpixels arranged at predetermined pitches in a vertical direction and in a horizontal direction, respectively, and a lenticular sheet 14 provided on the surface of the two-dimensional display 11. The lenticular sheet 14 includes plural cylindrical lenses 12 arranged parallel to each other. Examples of the two-dimensional display 11 include a liquid crystal display (LCD) panel, a cathode-ray tube (CRT) and a plasma display. The cylindrical lenses 12 may be manufactured by use of synthetic resin (including plastics) having high permeability at least, for example, with respect to visible light.

Figure 2:
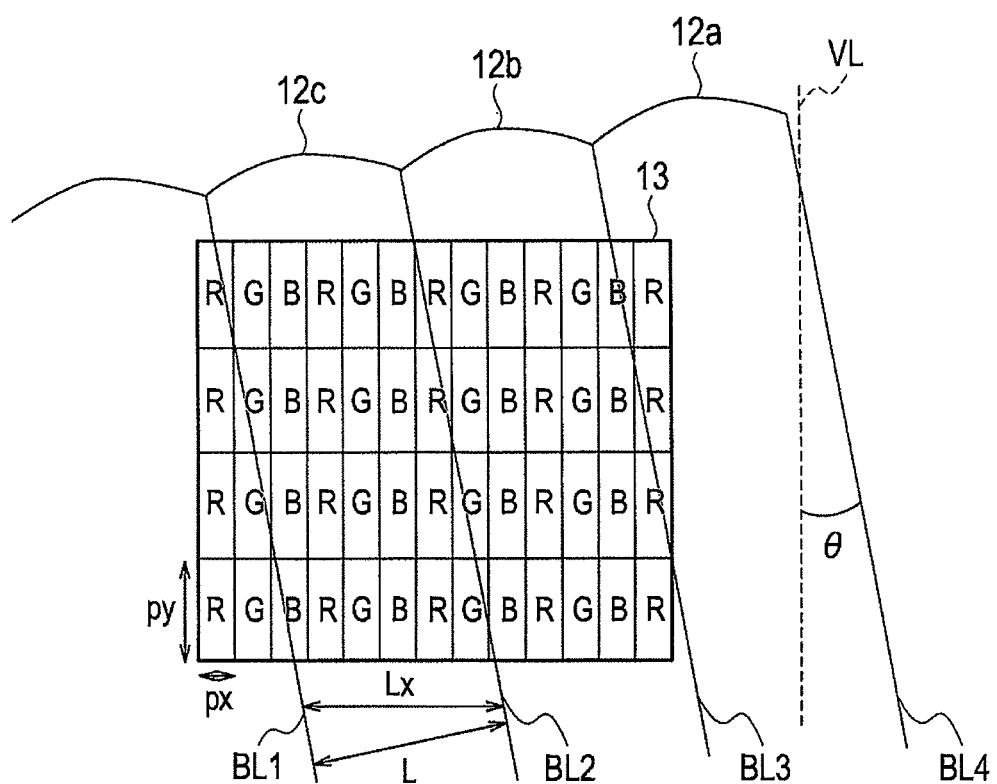
FIG. 2 is an enlarged plan view of a region ME in FIG. 1 showing a two-dimensional display 11 and plural cylindrical lenses 12.

Specific constitutions of the two-dimensional display 11 and the plural cylindrical lenses 12 in FIG. 1 will be explained with reference to FIG. 2. FIG. 2 is an enlarged plan view of a region ME in FIG. 1 showing the two-dimensional display 11 and the plural cylindrical lenses 12. The two-dimensional display 11 includes color subpixels 13 arranged at predetermined pitches in the vertical direction and in the horizontal direction, respectively. Each of plural rectangular shapes arranged in the vertical direction and in the horizontal direction in FIG. 2 shows the color subpixel 13 of the two-dimensional display 11. The color subpixels 13 of three different kinds of colors R (red), G (green) and B (blue) are periodically arranged in the horizontal direction, and the color subpixels of each color are arranged in the vertical direction. The characters R, G and B indicated in the rectangular shapes in FIG. 2 represent the respective colors.

Plural cylindrical lenses 12*a*, 12*b*, 12*c*, . . . are arranged parallel to each other in a one-dimensional direction. The color subpixels 13 are visually observed through the plural cylindrical lenses 12. The cylindrical lenses 12*a*, 12*b* and 12*c* have linear boundaries BL1 to BL4 parallel to each other inclined with respect to a vertical direction VL of the two-dimensional display 11. An inclined angle of the boundaries is defined as "θ".

Here, a lens pitch vertical to the boundaries BL1 to BL4 of the cylindrical lenses 12*a*, 12*b* and 12*c* (hereinafter, simply referred to as "a lens pitch") is defined as "L", and a lens pitch of the cylindrical lenses 12 in the horizontal direction (hereinafter, simply referred to as "a horizontal lens pitch") is defined as "Lx". In addition, a pixel pitch of the color subpixels 13 in the horizontal direction (hereinafter, simply referred to as "a horizontal pixel pitch") is defined as "px", and a pixel pitch of the color subpixels 13 in the vertical direction (hereinafter, simply referred to as "a vertical pixel pitch" is defined as "py". In the following explanations, although the condition of py/px=3 is applied, py/px may be other numerical values other than three. The cylindrical lenses 12*a*, 12*b* and 12*c* refract light only in a direction vertical to the boundaries BL1 to BL4.

Next, a method of segmenting an image into parallax images as finely as possible without increasing resolution of the two-dimensional display 11 will be explained.

Figure 3:
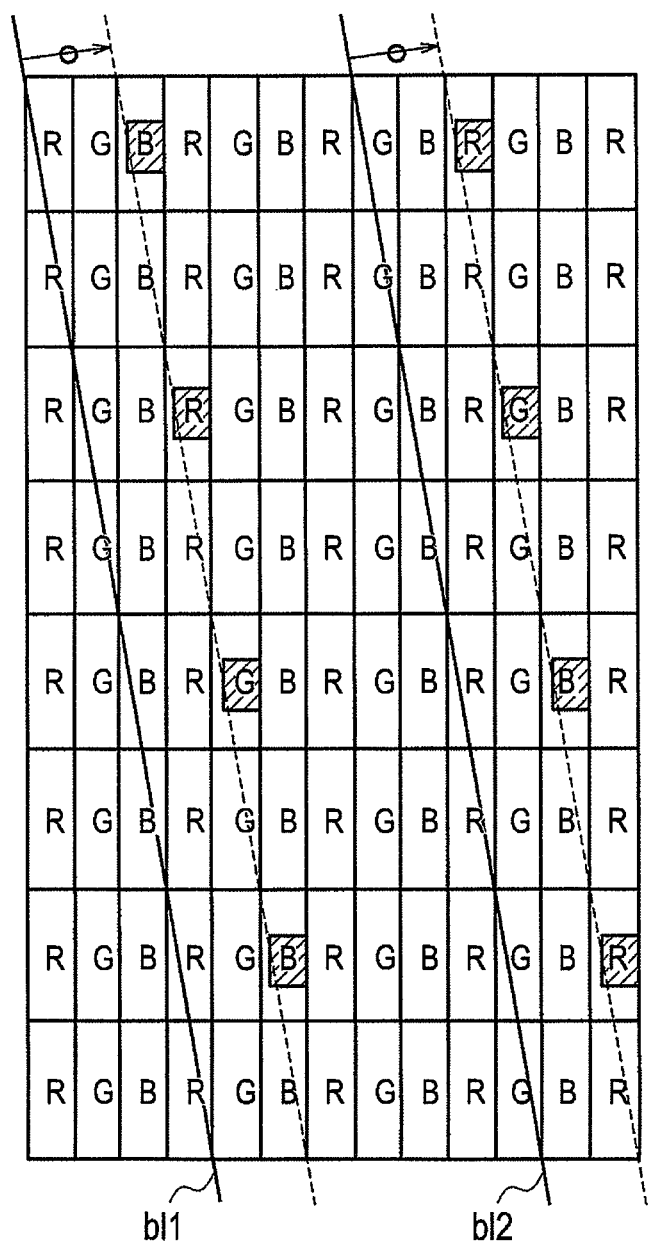
FIG. 3 is a plan view showing a first comparative example in which an inclined angle θ of cylindrical lenses is set to θ=arctan(px/(2·py))=9.46°, and a horizontal lens pitch Lx is set to Lx=7·px.

FIG. 3 shows a first comparative example in which the inclined angle θ of the cylindrical lenses 12 is set to θ=arctan (px/(2·py))=9.46°, and the horizontal lens pitch Lx is set to Lx=7·px. When the color subpixels of the two-dimensional display 11 are viewed through the cylindrical lenses 12 from a particular direction, only the color subpixels at the same distance from boundaries bl1 and bl2 of the cylindrical lenses 12 can be viewed. The distance of the viewable color subpixels from the boundaries bl1 and bl2 varies depending on the viewing direction. The color subpixels of three colors R, G and B appear periodically along the boundary bl1 and bl2 and thus, the respective color subpixels are arranged evenly in a screen of the two-dimensional display 11.

However, in the first comparative example of FIG. 3, since the horizontal lens pitch Lx is the integral multiple of the horizontal pixel pitch px, the segmentation of the color subpixels of the two-dimensional display 11 relative to the boundaries bl1 and bl2 cannot be made into the horizontal pixel pitch px or lower.

In view of this, as described above, the horizontal lens pitch Lx is deviated from the integral multiple of the horizontal pixel pitch px so that the segmentation of the color subpixels of the two-dimensional display 11 relative to the boundaries bl1 and bl2 is made into the horizontal pixel pitch px or lower. As a result, the segmented parallax images are arranged across the plural cylindrical lenses. Accordingly, the segmentation number of the parallax images can be increased without an increase in resolution of the two-dimensional display 11.

Figure 4:
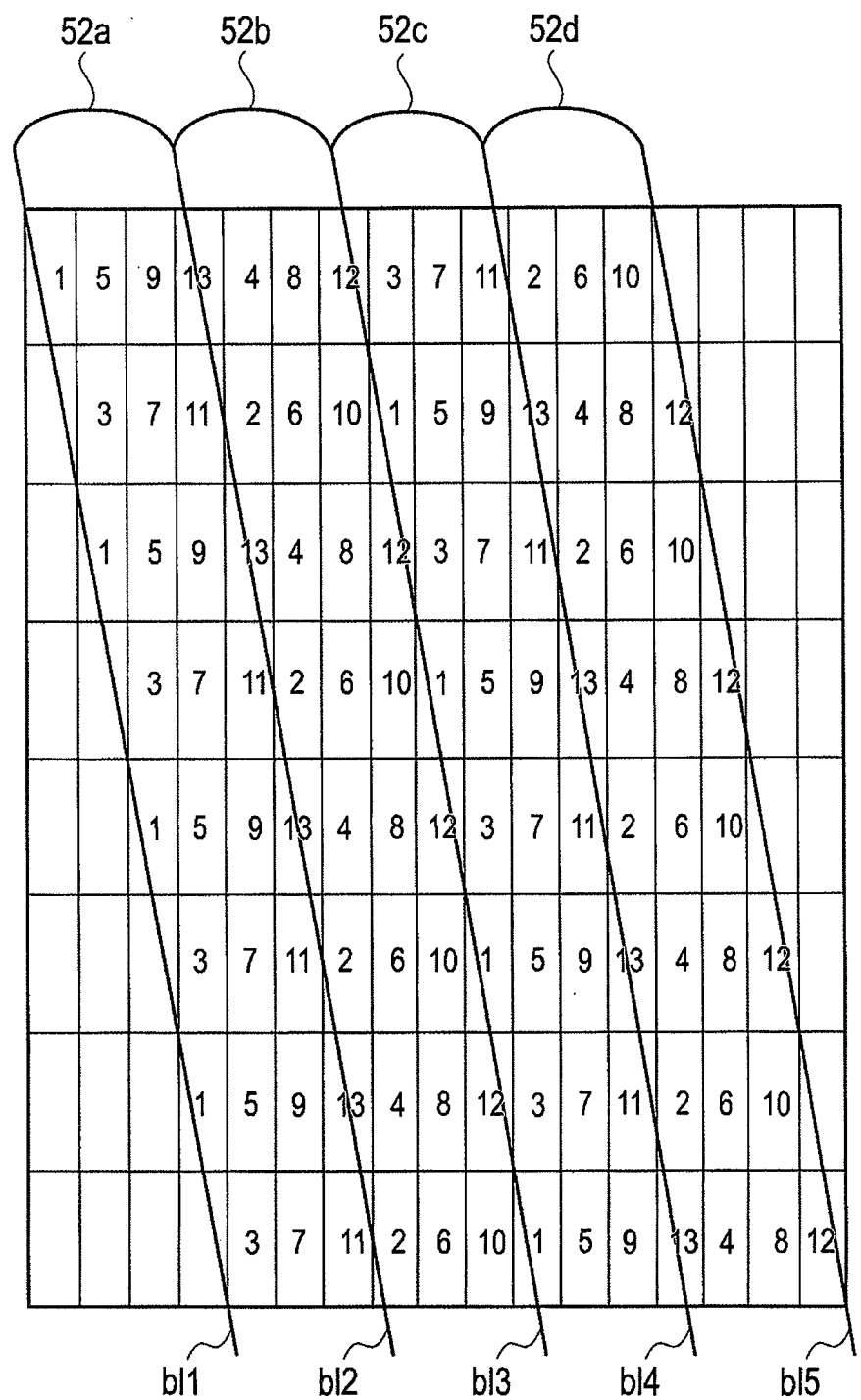
FIG. 4 is a plan view showing a second comparative example in which θ is set to θ=9.46°, and a horizontal lens pitch Lx=L/cos θ is set to 13·px/4=3.25·px.

FIG. 4 shows a second comparative example in which θ is set to 9.46°, and the horizontal lens pitch Lx=L/cos θ is set to 13·px/4=3.25·px. The numbers indicated in each color subpixel represent the numbers of 13 segmented parallax images. The 13 segmented parallax images are arranged across four cylindrical lenses 52*a* to 52*d*.

Here, in the second comparative example, there is a problem of generation of oblique line noise parallel to the boundaries bl1 to bl5 of the cylindrical lenses 52*a* to 52*d*.

According to FIG. 4, the cylindrical lenses 52*a* and 52*c* correspond only to the odd-numbered parallax images, and the cylindrical lenses 52b and 52d correspond only to the even-numbered parallax images. Thus, the odd-numbered parallax images are not displayed in the cylindrical lenses 52b and 52d, and the even-numbered parallax images are not displayed in the cylindrical lenses 52a and 52c. When parallax images SP1 to SP13 having a parallax in the horizontal direction are sequentially allocated to the cylindrical lenses, oblique line noise parallel to the boundaries bl1 to bl5 of the cylindrical lenses 52a to 52d is caused. Further, when the horizontal lens pitch Lx is adjusted to obtain further finely segmented parallax images, the number of the viewpoints not displayed is increased when one cylindrical lens is observed. As a result, the oblique line noise is further distinguished.

On the other hand, according to the first embodiment, all of the parallax images SP1 to SP13 can be displayed at least once in each of the cylindrical lenses 52a to 52d by the proper setting of the inclined angle θ of the cylindrical lenses 52a to 52d. As a result, it is possible to prevent a generation of oblique line noise parallel to the boundaries bl1 to bl5 of the lenticular lenses 52a to 52d in the entire parallax view even when the horizontal lens pitch Lx is deviated from the integral multiple of the horizontal pixel pitch px and the segmented parallax images are displayed across the plural cylindrical lenses 52a to 52d.

Figure 5:
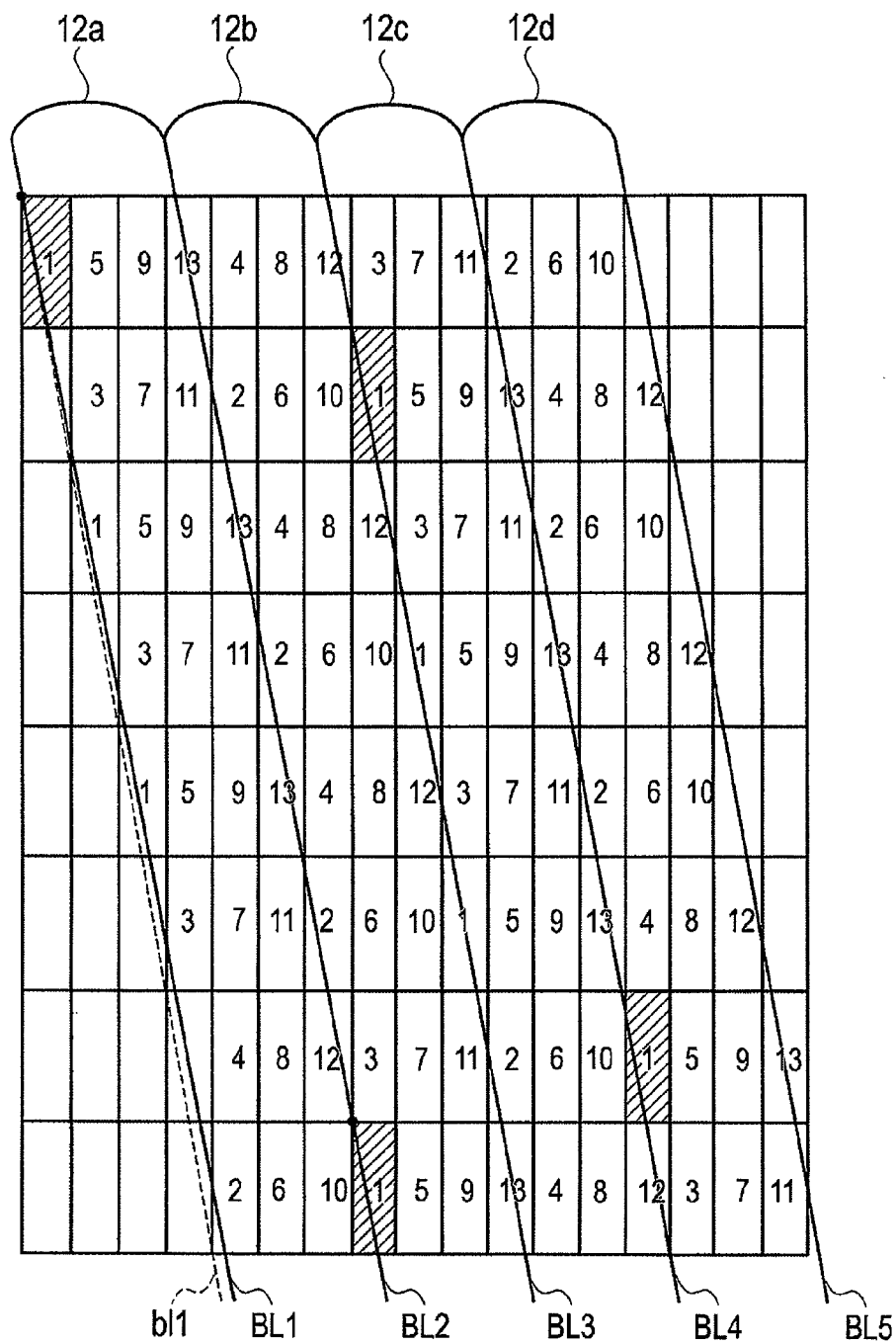
FIG. 5 is a plan view showing the first embodiment in which θ=10.23°, and Lx=3.25·px.

FIG. 5 shows the first embodiment of the present invention in which θ=10.23°, and Lx=3.25·px. Compared with the second comparative example of FIG. 4, the inclined angle θ is changed from 9.46° to 10.23°. With the change of the inclined angle θ, the boundary of the cylindrical lens is shifted from the boundary bl1 to the boundary BL1. The same applies to the other boundaries BL2 to BL5. In the example shown in FIG. 5, all of the parallax images 1 to 13 appear in each of the cylindrical lenses 12a to 12d. Therefore, oblique line noise caused in the second comparative example shown in FIG. 4 can be prevented.

In particular, the horizontal pixel pitch px, the vertical pixel pitch py, the horizontal lens pitch Lx of the cylindrical lenses 12a to 12d, and the inclined angle θ of the boundaries BL1 to BL5 of the cylindrical lenses 12a to 12d are only required to satisfy each relational expression represented by the formula (1), the formula (2) and the formula (3). Here, Ax and Ay are relatively prime natural numbers, and Bx is a minimum natural number by which the numerical value GF indicated in the formula (2) represents an integer value.

$$\theta=\arctan\{(Ax \cdot px)/(Ay \cdot py)\} \quad (1)$$

$$GF=Bx \cdot Lx/px \quad (2)$$

$$Ay \geq Bx \geq 2 \text{ and } Ax \geq 2 \quad (3)$$

When px, py, Lx and θ satisfy the relational expressions represented by the formula (1) to the formula (3), the number V of the parallax images segmented is represented by the formula (6). Here, {Bx, Ay} represents a least common multiple of Bx and Ay.

$$V=\{Bx,Ay\} \cdot Lx/px \quad (6)$$

When the condition of Bx≥2 in the formula (3) is fulfilled, the horizontal lens pitch Lx can be deviated from the integral multiple of the horizontal pixel pitch px. Therefore, since the segmentation of the parallax images across the plural cylindrical lenses can be possible, the segmentation number of the parallax images is increased without an increase of the horizontal lens pitch Lx with respect to the horizontal pixel pitch px. Further, when the condition of Ay≥Bx is fulfilled, all of the parallax images are displayed at least once in each of the cylindrical lenses 12a to 12d. Accordingly, even when the horizontal lens pitch Lx is deviated from the integral multiple of the horizontal pixel pitch px, and the segmentation of the parallax images is made across the multiple cylindrical lenses 12a to 12d, it is possible to prevent a generation of oblique line noise parallel to the boundaries BL1 to BL5 of the cylindrical lenses 12a to 12d in the entire parallax view. Note that it is assumed that the size of a screen of the two-dimensional display 11 in the autostereoscopic display apparatus is limitless.

When the color subpixels of the two-dimensional display 11 are observed through the cylindrical lenses 12a to 12d, the color subpixels are enlarged and resolution of the parallax images is reduced. The size of the enlarged color subpixels is proportional to the lens pitch L and 1/tan θ. The size of the color subpixels is increased as θ is decreased and as a result, the resolution of the parallax images is reduced. When Ax≥2 is fulfilled, an excessive decrease of θ is prevented even if Bx and Ay are increased. Accordingly, a reduction in resolution can be prevented.

Next, the conditions that each parameter (px, py, Lx, θ) should fulfill in order to prevent unevenness of color will be explained. Two color subpixels observed through the two cylindrical lenses 12 adjacent to each other and having a minimum relative distance, among the color subpixels indicating the identical parallax images, are different in color. The inclined angle θ is configured in such a manner that the two color subpixels have different colors approximately in the entire region of the screen of the two-dimensional display 11. Accordingly, an uneven distribution of the color subpixels of the identical colors can be prevented and therefore, unevenness of color due to the uneven color distribution can be prevented.

In particular, when α and β, by which GH in the formula (5) represents a minimum value, among the natural numbers α and β satisfying the formula (4) are defined as $α_0$ and $θ_0$, each numerical value of px, py, Lx and θ is set in such a manner that $α_0$ is not a multiple of D. Here, D represents the number of colors of color subpixels included in the two-dimensional display 11. Note that it is only required that $α_0$ is not a multiple of three since the color subpixels of three colors R, G and B have a periodically-arranged constitution.

$$\alpha \cdot px + \beta \cdot py \cdot \tan \theta = Lx \quad (4)$$

$$GH=(\alpha \cdot px)^2+(\beta \cdot py)^2 \quad (5)$$

Figure 6:
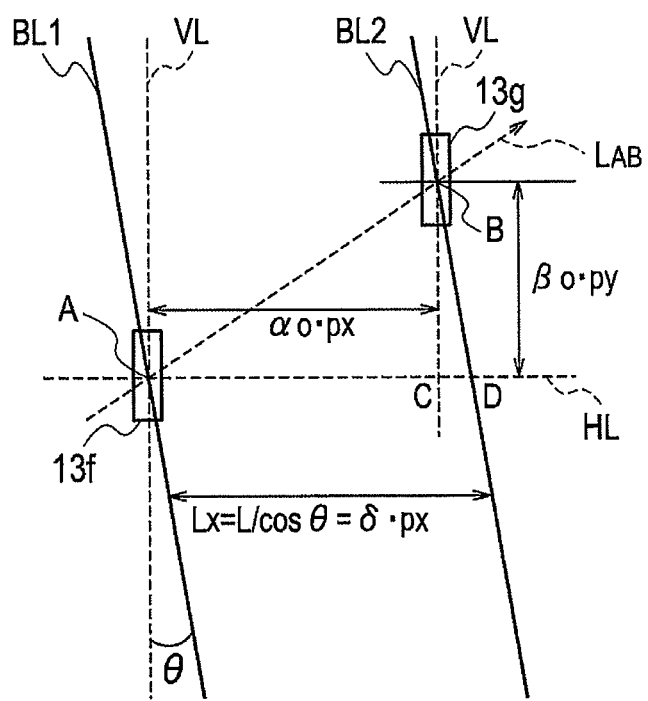
FIG. 6 is a schematic view explaining conditions that each parameter should fulfill in order to prevent unevenness of color.

Next, the formula (4) and the formula (5) are explained with reference to FIG. 6. FIG. 6 shows arbitrary two color subpixels 13f and 13g, and the boundaries BL1 and BL2 of the cylindrical lens 12. The boundary BL1 passes through a center A of the color subpixel 13f, and the boundary BL2 passes through a center B of the color subpixel 13g. When focusing on triangles BAC and BCD, it is recognized that the natural numbers α and β are required to satisfy the formula (4). Further, it is recognized that it is only required that $α_0$ is not a multiple of three in order for the color subpixel 13f and the color subpixel 13g to have different colors.

When the screen of the two-dimensional display 11 is viewed through the cylindrical lenses 12, the different colors arranged in order of such as R, G, B, R, . . . or R, B, G, R, . . . are displayed constantly along a straight line $L_{AB}$. A length ($GH^{1/2}$) of a segment of the center A and the center B is a relative distance of the color subpixels 13f and 13g. The respective $α_0$ and $β_0$ are selected in such a manner that the relative distance is a minimum value. Therefore, the color subpixels of R, G and B are arranged sequentially in the direction of the line AB with a small period ($3 \times GH^{1/2}$). As a result, unevenness of color can be prevented.

In the first embodiment of the present invention, the two-dimensional display 11 including the color subpixels of three colors R, G and B periodically arranged in the horizontal direction was explained. Alternatively, the two-dimensional display in which the color subpixels of four colors further including Y (yellow) or the color subpixels of multiple colors of more than four are periodically arranged in the horizontal direction can also prevent unevenness of color if the numerical value of $\alpha_0$ is not a multiple of the color number (D).

<Constitutions and Operations of Temperature Sensor 31 and Parallax Image Changer 22>

As shown in FIG. 1(a), the autostereoscopic display apparatus further includes a temperature sensor 31 that measures an ambient temperature T of the cylindrical lenses 12, and a parallax image changer 22 that changes parallax images displayed in the two-dimensional display 11 based on the ambient temperature T measured by the temperature sensor 31. The parallax image changer 22 includes a parallax image storage unit 32 that stores plural ambient temperatures and plural kinds of parallax images corresponding to the plural ambient temperatures in relation to each other.

For example, the parallax image storage unit 32 stores a table indicating a relationship between plural kinds of parallax images S1 to S3 and the ambient temperature T, as shown in FIG. 1(b). The parallax images S1 to S3 stored in the parallax image storage unit 32 are, for example, generated as follows. The autostereoscopic display apparatus is used at the temperature approximately in the range of 0° C. to 60° C., and it is assumed that a mainly used middle temperature is 30° C. Here, a lower limit temperature T1 is set at 20° C., and an upper limit temperature T2 is set at 40° C. In this case, each parallax image S1 corresponds to the temperature in the range of 0° C. to 20° C., each parallax image S2 corresponds to the temperature in the range of 20° C. to 40° C., and each parallax image S3 corresponds to the temperature in the range of 40° C. to 60° C., respectively. A coefficient of linear expansion of the cylindrical lenses 12 is $y=7.0\times10^{-5}$ [1/° C.]. The parallax images S2 are generated under the condition in which the lens pitch L at the middle temperature 30° C. is defined as L2=0.779 mm. The parallax images S1 correspond to the case in which the temperature is 20° C. lower than the parallax images S2. Therefore, the parallax images S1 are generated under the condition in which the lens pitch L is defined as L1=(1−20·γ)·L2=0.778 mm. The parallax images S3 correspond to the case in which the temperature is 20° C. higher than the parallax images S2. Thus, the parallax images S3 are generated under the condition in which the lens pitch L is defined as L3=(1+20·γ)·L2=0.780 mm.

The parallax image changer 22 selects parallax images corresponding to the ambient temperature T measured by the temperature sensor 31 in reference to the parallax image storage unit 32, and displays the selected parallax images on the two-dimensional display 11. For example, the parallax image changer 22 may select the parallax images corresponding to the ambient temperature T measured by the temperature sensor 31 from the parallax images S1 to S3 shown in FIG. 1(b), and output the selected parallax images to the two-dimensional display 11.

Here, the parallax image changer 22 has a functional constitution executed by a micro processing unit (MPU) including a data computing unit, a register or a memory unit that temporally stores data, and an input-output unit that interfaces with peripheral equipment. In this case, the parallax image storage unit 32 serves as a register or a memory unit. Alternatively, the parallax image storage unit 32 may serve as an external memory unit such as a semiconductor memory.

Figure 7:
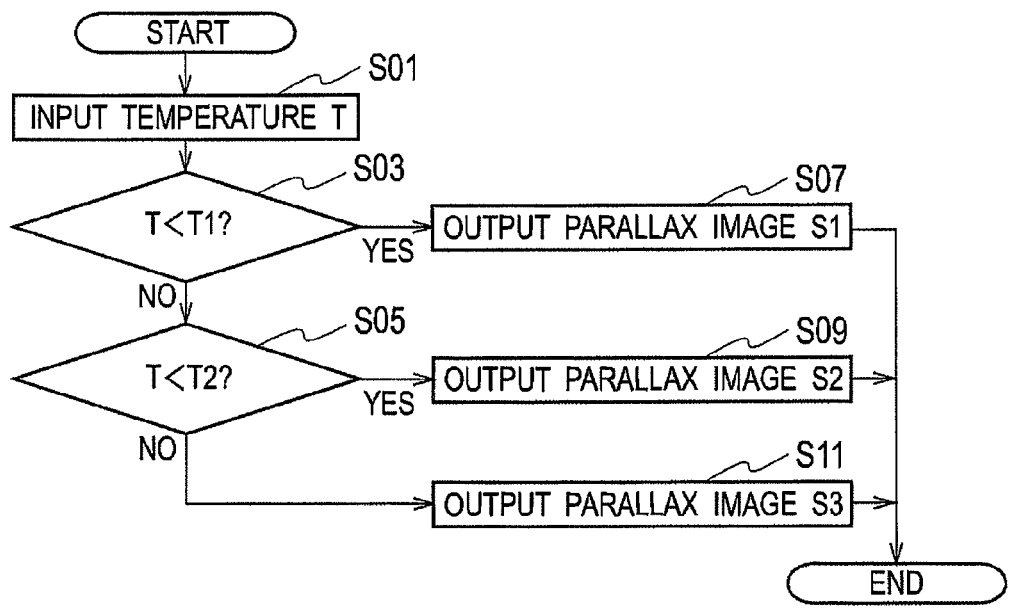
FIG. 7 is a flow chart showing an example of an operation of changing parallax images in the autostereoscopic display apparatus.

Next, a changing operation of the parallax image changer 22 in the autostereoscopic display apparatus will be explained with reference to FIG. 7.

When a detection temperature T detected by the temperature sensor 31 is input to the parallax image changer 22 (S01), it is determined whether the detection temperature T is lower than the lower limit temperature T1 or not (S03). If the detection temperature T is lower than the lower limit temperature T1, the parallax images S1 are read from the parallax image storage unit 32 and output to the two-dimensional display 11 (S07). If the detection temperature T is equal to or higher than the lower limit temperature T1, it is determined whether the detection temperature T is lower than the upper limit temperature T2 (S05). If the detection temperature T is lower than the upper limit temperature T2, the parallax images S2 are read from the parallax image storage unit 32 and output to the two-dimensional display 11 (S09). If the detection temperature T is equal to or higher than the upper limit temperature T2, the parallax images S3 are read from the parallax image storage unit 32 and output to the two-dimensional display 11 (S11).

As explained above, the actual lens pitch of the cylindrical lenses 12 or the actual inclined angle of the boundaries of the cylindrical lenses 12 may be changed from the initial value of the lens pitch L or the inclined angle θ in accordance with the change of the ambient temperature. In such a case, the parallax images are changed based on the amount of change from the initial value of the lens pitch or the inclined angle, that is, the lens pitch L or the inclined angle θ before the temperature change. The horizontal pixel pitch px, the vertical pixel pitch py, the horizontal lens pitch Lx and the inclined angle θ fulfill the relational expressions represented by the formula (1) to the formula (5). Therefore, line noise and unevenness of color are not easily caused also in the parallax images changed in accordance with the temperature change. This is because the respective color subpixels 13 are variously located relative to the cylindrical lenses 12, and consistently have a random property. The random property is increased as the values of Ax and Ay described above are increased and therefore, a generation of line noise is further prevented. As a result, a fine stereoscopic image can be obtained even when the temperature is changed.

The parallax image changer 22 preliminarily calculates lens pitches L of the cylindrical lenses 12 with respect to assumed plural ambient temperatures T, and computes parallax images displayed on the two-dimensional display 11 with respect to the calculated lens pitches L. The parallax image changer 22 stores the plural kinds of the calculated parallax images S1 to S3 in the parallax image storage unit 32 in relation to the ranges of the assumed plural ambient temperatures T as shown in FIG. 1(b). Accordingly, a load of frequent calculations of the lens pitch L or reconstructions of the parallax images depending on the ambient temperature T measured by the temperature sensor 31 can be reduced.

It is obvious that the parallax image changer 22 does not necessarily include the parallax image storage unit 32 to store the data of the parallax images S1 to S3 in relation to the detection temperature T. In such a case, the parallax image changer 22 may frequently calculate the amount of expansion and contraction of the lens pitch L of the cylindrical lenses according to the ambient temperature T measured by the temperature sensor 31, reconstruct the parallax images based on the amount of expansion and contraction of the lens pitch L, and display the reconstructed parallax images on the two-dimensional display 11. Accordingly, the temperature correction of the parallax images can be performed with higher accuracy. Note that the reconstruction of the parallax images displayed on the two-dimensional display 11 in accordance with the relative position between the cylindrical lenses 12 and the color subpixels 13 is a technique well-known to one of ordinary skill in the art, namely, a technical common knowledge, as described in Japanese Patent Unexamined Publication No. 2008-067095. The content of Japanese Patent Unexamined Publication No. 2008-067095 is herein incorporated by reference.

Example 1

Figure 8:
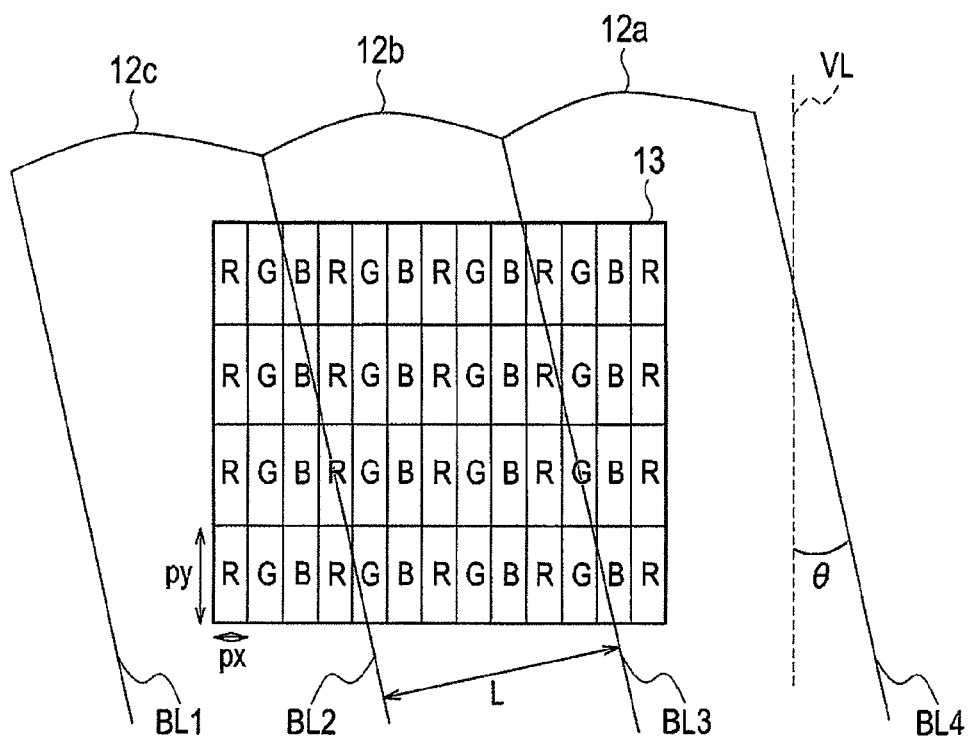
FIG. 8 is a plan view showing a constitution of an autostereoscopic display apparatus according to Example 1.

The following is an explanation of Example 1 according to the first embodiment. FIG. 8 is a plan view showing a constitution of the autostereoscopic display apparatus according to Example 1. FIG. 9 is a table showing preconditions of each parameter of the autostereoscopic display apparatus shown in FIG. 8. As shown in FIG. 8, the color subpixels of the identical colors are arranged in the vertical direction, and the color subpixels of R (red), G (green) and B (blue) are periodically arranged in the horizontal direction. The plural cylindrical lenses 12a, 12b, 12c, ... are arranged parallel to each other in a one-dimensional direction. Each color subpixel is observed through the plural cylindrical lenses 12a, 12b, 12c, .... The boundaries BL1 to BL4 of the cylindrical lenses 12a to 12c are inclined at the inclined angle θ to the vertical direction VL of the two-dimensional display 11. Here, the horizontal pixel pitch is px=0.1 mm, and the vertical pixel pitch is py=0.3 mm.

As shown in FIG. 9, the inclined angle θ and the lens pitch L are respectively set to θ=11.77° and L=0.779 mm. The formula (1) is satisfied when Ax=5 and Ay=8, and the constant Bx with regard to the lens pitch fulfills Bx=8; that is, Bx=Ay=8. Thus, a generation of oblique line noise can be prevented.

FIG. 10 is simulation images when observing the 61 segmented parallax images from one point through the cylindrical lenses 12. FIG. 10(a) shows the case in which the parallax images corresponding to the lens pitch of L=0.779 mm are observed through the cylindrical lenses 12. It is recognized that there is no oblique line noise in FIG. 10(a). FIG. 10(b) shows the case in which the parallax images are reconstructed in accordance with the relative position between the cylindrical lenses 12 and the color subpixels in view of 0.5%-broadening of the lens pitch L, and observed through the cylindrical lenses 12. It is recognized that the oblique line noise observed in FIG. 17(b) is not caused in FIG. 10(b) even though the parallax images are reconstructed. In addition, the inventor has confirmed that a generation of color unevenness is suppressed.

The amount of change of the lens pitch L caused in the variation range (0° C. to 60° C.) of the assumed ambient temperatures T is ±20×α≈±0.14%, which is smaller than the amount of change of the lens pitch L shown in FIG. 10 which is 0.5%. Therefore, oblique line noise and unevenness of color are not caused in the parallax images after reconstruction in the temperature range of 0° C. to 60° C. exemplified in the first embodiment.

Second Embodiment

Parallax images displayed on an autostereoscopic display apparatus are generally easily influenced by an angle error of the boundaries BL of the cylindrical lenses 12 with respect to the pixel pitch of the two-dimensional display 11, and a production error caused when the cylindrical lenses 12 are attached to the two-dimensional display 11. In addition, the parallax images are also influenced by a production error caused in the individual process of producing the cylindrical lenses 12. In a second embodiment of the present invention, an autostereoscopic display apparatus that corrects a variation of the lens pitch L of the cylindrical lenses 12 caused by a production error and corrects an error of a fixing angle of the lenticular sheet 14 fixed to the two-dimensional display 11 will be explained.

As shown in FIG. 11(a), the autostereoscopic display apparatus according to the second embodiment includes the two-dimensional display 11, the lenticular sheet 14 including the plural cylindrical lenses 12, a production error storage unit 33 that stores a production error ΔL of the lens pitch L of the cylindrical lenses 12 and a production error Δθ of the inclined angle θ of the boundaries BL of the cylindrical lenses 12, and the parallax image changer 22 that changes parallax images based on the production errors stored in the production error storage unit 33. The constitutions of the two-dimensional display 11 and the lenticular sheet 14 are the same as those in the first embodiment, and the explanations thereof are thus not repeated.

Here, a "production error" is a margin of error from a design value or a target value caused when the autostereoscopic display apparatus is manufactured. The "production error" includes an error caused when the plural cylindrical lenses 12 are attached to the two-dimensional display 11 and an error caused in the individual process of producing the cylindrical lenses 12. The production error caused when attaching the cylindrical lenses 12 to the two-dimensional display 11 or in the individual process of producing the cylindrical lenses 12 is stored in the production error storage unit 33 before shipping the autostereoscopic display apparatus.

The production error Δθ of the inclined angle θ includes an error caused in the cylindrical lenses 12 themselves and an error caused when attaching the cylindrical lenses 12 to the two-dimensional display 11. Therefore, the production error storage unit 33 stores a sum of both errors as the production error Δθ of the inclined angle θ.

The error of the cylindrical lenses 12 themselves may be detected by, for example, preparing data showing a one-to-one error with regard to each of the cylindrical lenses 12. The error caused during the attaching process may be detected as follows. First, each of the two-dimensional display 11 and the cylindrical lenses 12 is provided with a positioning mark. Then, the amount of gap between the respective positioning marks is measured by, for example, a CCD camera to detect the error. Note that the detection of each of the production error ΔL of the lens pitch L and the production error Δθ of the inclined angle θ is not limited to the method described above, and the detection may be carried out by other methods.

The parallax image changer 22 includes a parallax image storage unit 34 that stores plural production errors and plural kinds of parallax images corresponding to the production errors in relation to each other. The parallax image storage unit 34 stores, for example, an error table shown in FIG. 11(b). The production error ΔL of the lens pitch L is divided into three stages of less than −0.5 μm, from −0.5 μm to +0.5 μm, and more than +0.5 μm. The production error Δθ of the inclined angle θ is divided into three stages of less than −0.05, from −0.05 to +0.05, and more than +0.05. Nine parallax images S1 to S9 corresponding to the combinations of the three stages of the production error ΔL and the three stages of the production error Δθ are stored in the parallax image storage unit 34. Note that the dividing number of the production errors ΔL and Δθ is not limited to the above-described case. For example, the production errors ΔL and Δθ may be divided more finely.

FIG. 11(c) shows lens parameters of the cylindrical lenses 12 used when generating the respective parallax images S1 to S9. The lens parameters include the lens pitch L and the inclined angle θ of the cylindrical lenses 12. The design value or the target value of the lens pitch L is 0.779 mm. The other values 0.778 mm and 0.780 mm are also assumed as the lens pitches L. The design value or the target value of the inclined angle θ is 11.77°. The other values 11.67° and 11.87° are also assumed as the inclined angles θ. The respective parallax images S1 to S9 in FIG. 11(b) are generated in accordance with the relative position between the cylindrical lenses 12 and the color subpixels 13 of the two-dimensional display 11 by use of the lens parameters shown in FIG. 11(c).

However, unevenness of color may be caused in the parallax images S1 to S9 in the ranges of the production errors stored in the parallax image storage unit 34. Thus, it is preferable to preliminarily confirm that all parallax images S1 to S9 have a uniform image quality with less unevenness of color in the ranges of the production errors stored in the parallax image storage unit 34. Here, the inventor has confirmed that all parallax images S1 to S9 can have a uniform image quality with less unevenness of color in the error ranges shown in FIG. 11(b) and FIG. 11(c). Therefore, no oblique line noise is caused and a uniform image quality with less unevenness of color is achieved in the reconstructed parallax images in the error ranges of the cylindrical lenses 12 shown in FIG. 11(b).

The parallax image changer 22 shown in FIG. 11(a) selects the parallax images corresponding to the production errors stored in the production error storage unit 33 from the parallax images S1 to S9 by referring to the parallax image storage unit 34, and displays the selected parallax images on the two-dimensional display 11. For example, the parallax image changer 22 may select the parallax images, among the parallax images S1 to S9 stored in the parallax image storage unit 34, corresponding to the production error ΔL and the production error Δθ stored in the production error storage unit 33, and output the selected parallax images to the two-dimensional display 11.

Figure 12:
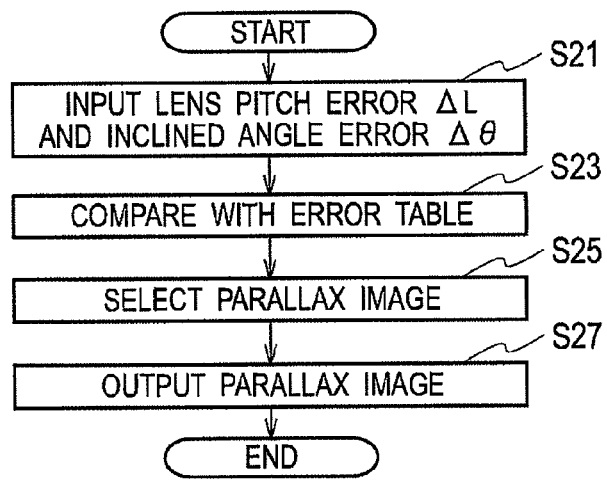
FIG. 12 is a flow chart showing an example of an operation of changing parallax images in the autostereoscopic display apparatus according to the second embodiment.

Next, a changing operation of the parallax image changer 22 in the autostereoscopic display apparatus will be explained with reference to FIG. 12.

When the production error ΔL and the production error Δθ stored in the production error storage unit 33 are input into the parallax image changer 22 (S21), the production error ΔL and the production error Δθ are compared with the error table shown in FIG. 11(b) (S23), and the parallax images corresponding to the production error ΔL and the production error Δθ are selected from the parallax images S1 to S9 in the error table (S25). The selected parallax images are then output to the two-dimensional display 11 (S27).

As described above, the parallax images are changed based on the production error ΔL of the lens pitch of the cylindrical lenses 12 and the production error Δθ of the inclined angle of the boundaries BL of the cylindrical lenses 12. The horizontal pixel pitch px, the vertical pixel pitch py, the horizontal lens pitch Lx and the inclined angle θ fulfill the relational expressions represented by the formula (1) to the formula (5). Thus, oblique line noise and unevenness of color are not easily caused in the parallax images even after the change. Accordingly, a fine stereoscopic image can be obtained even if the production errors are caused.

The parallax image changer 22 preliminarily computes the respective parallax images S1 to S9 displayed on the two-dimensional display 11 with respect to assumed production error ranges. The parallax image changer 22 stores the computed parallax images S1 to S9 in the parallax image storage unit 34 in relation to the assumed production error ranges as shown in FIG. 11(b). Accordingly, a computing load of frequent reconstructions of the parallax images according to the production errors stored in the production error storage unit 33 can be reduced.

The parallax image changer 22 does not necessarily include the parallax image storage unit 34 that stores the data of the parallax images S1 to S9 in relation to the production error ranges. In such a case, the parallax image changer 22 may reconstruct the parallax images frequently according to the production errors stored in the production error storage unit 33, and display the reconstructed parallax images on the two-dimensional display 11. Accordingly, the production error correction of the parallax images can be carried out with higher accuracy.

Third Embodiment

A proper lens pitch L' of the cylindrical lenses 12 is changed from the actual lens pitch L depending on a distance C between the autostereoscopic display apparatus and a viewer. In order to view parallax images of the same viewpoint in the entire screen of the autostereoscopic display apparatus, setting the proper lens pitch L' in accordance with the formula (7) is effective. Note that fin the formula (7) represents a focus distance of the cylindrical lenses 12. The condition of L=L' is acceptable if the distance C is sufficiently long with respect to the focus distance f of the lenses. However, if the distance C is short, the difference between the proper lens pitch L' and the actual lens pitch L should not be ignored.

It may be considered that the distance C is not constant. Therefore, the relationship between the distance C and the proper lens pitch L' and the focus distance f is dynamically changed. It is preferable to frequently calculate the proper lens pitch L' to reconstruct parallax images in accordance with the change of the distance C.

In a third embodiment of the present invention, an autostereoscopic display apparatus in which parallax images are reconstructed according to the distance C viewed by a viewer will be explained.

Figure 13:
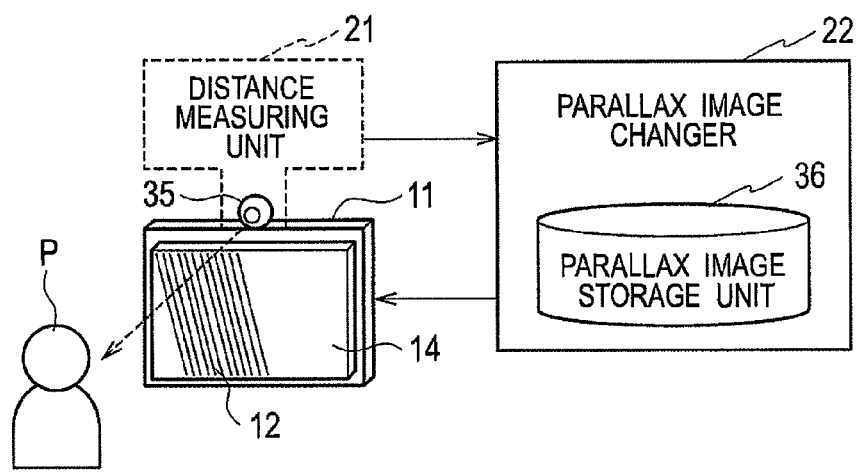
FIG. 13(*a*) is a block diagram showing an entire constitution of an autostereoscopic display apparatus according to a third embodiment of the present invention, and FIG. 13(*b*) is a table showing a relationship between parallax images S1 to S3 and a proper lens pitch stored in a parallax image storage unit 36 shown in FIG. 13(*a*).

As shown in FIG. 13(a), the autostereoscopic display apparatus according to the third embodiment includes the two-dimensional display 11, the lenticular sheet 14 including the plural cylindrical lenses 12, a distance measuring unit 21 that measures the distance C between the cylindrical lenses 12 and a viewer P, and the parallax image changer 22 that changes parallax images displayed on the two-dimensional display 11 based on the distance C measured by the distance measuring unit 21. The constitutions of the two-dimensional display 11 and the lenticular sheet 14 are the same as those in the first embodiment, and the explanations thereof are thus not repeated.

The distance measuring unit 21 includes a CCD camera 35 that captures a face image of the viewer P. The distance measuring unit 21 recognizes the face of the viewer P based on the face image captured by the CCD camera 35. The distance measuring unit 21 calculates a spatial coordinate of a viewing position of the viewer P based on the position and size of the face. The distance measuring unit 21 then calculates the distance C between the cylindrical lenses 12 and the viewer P. The distance measuring unit 21 may use a TOF (time of flight) camera instead of the CCD camera 35 to directly measure the distance C.

The parallax image changer 22 calculates the proper lens pitch L' of the cylindrical lenses 12 by means of the formula (7) based on the distance C measured by the distance measuring unit 21.

$$L'=L*C/(C+f) \qquad (7)$$

The parallax image changer 22 includes a parallax image storage unit 36 that stores plural proper lens pitches L' and plural kinds of parallax images S1 to S3 corresponding to the plural proper lens pitches L' in relation to each other.

The parallax image storage unit 36 stores, for example, a table showing a relationship between the plural kinds of the parallax images S1 to S3 and the proper lens pitch L' as shown in FIG. 13(b). For example, each parallax image S3 is generated to correspond to L'=0.779 mm, each parallax image S2 is generated to correspond to L'=0.777 mm, and each parallax image S1 is generated to correspond to L'=0.775 mm. Therefore, a lower limit lens pitch L1 may be set to L'=0.776 mm, and an upper limit lens pitch L2 may be set to L'=0.778 mm.

The parallax image changer 22 selects parallax images corresponding to the proper lens pitch L' calculated in accordance with the formula (7), and displays the selected parallax images on the two-dimensional display 11. For example, the parallax image changer 22 may select the parallax images corresponding to the calculated proper lens pitch L' from the parallax images S1 to S3 shown in FIG. 13(b), and output the selected parallax images to the two-dimensional display 11.

Figure 14:
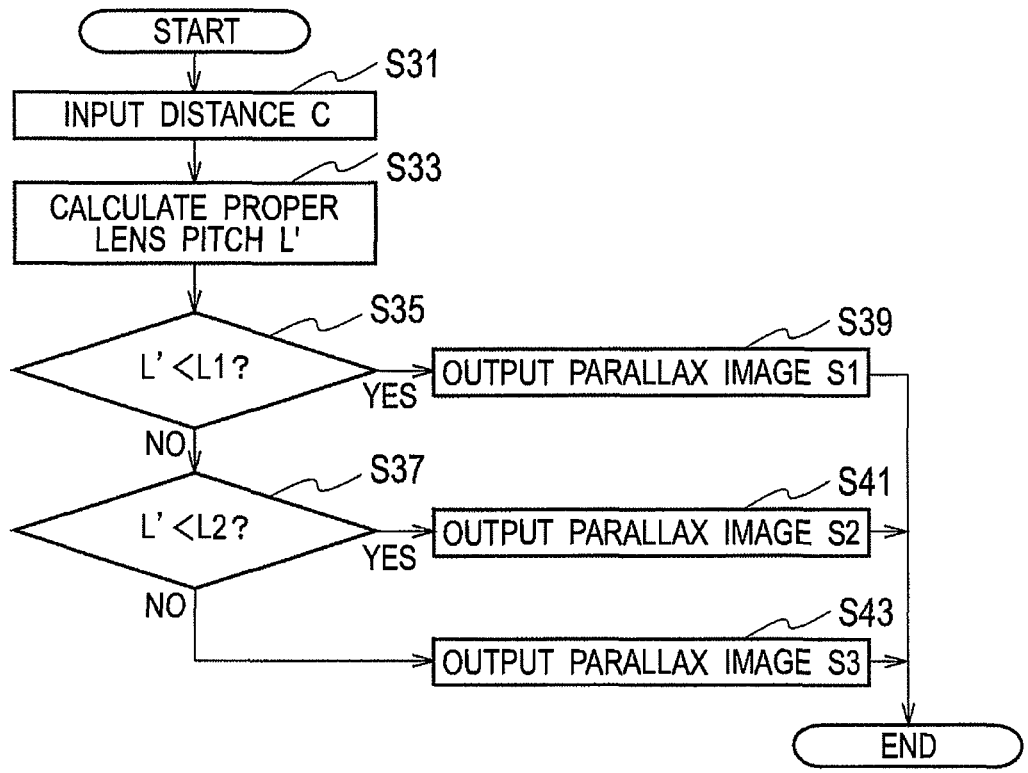
FIG. 14 is a flow chart showing an example of an operation of changing parallax images in the autostereoscopic display apparatus according to the third embodiment.

Next, a changing operation of the parallax image changer 22 in the autostereoscopic display apparatus according to the third embodiment will be explained with reference to FIG. 14. When the distance C measured by the distance measuring unit 21 is input into the parallax image changer 22 (S31), the proper lens pitch L' is calculated based on the distance C in accordance with the formula (7) (S33). Then, it is determined whether the proper lens pitch L' is smaller than the lower limit lens pitch L1 or not (S35). When the proper lens pitch L' is smaller than the lower limit lens pitch L1, the parallax images S1 are read from the parallax image storage unit 36 and output to the two-dimensional display 11 (S39). When the proper lens pitch L' is equal to or larger than the lower limit lens pitch L1, it is determined whether the proper lens pitch L' is smaller than the upper limit lens pitch L2 (S37). When the proper lens pitch L' is smaller than the upper limit lens pitch L2, the parallax image S2 are read from the parallax image storage unit 36 and output to the two-dimensional display 11 (S41). When the proper lens pitch L' is equal to or larger than the upper limit lens pitch L2, the parallax images S3 are read from the parallax image storage unit 36 and output to the two-dimensional display 11 (S43).

As described above, the proper lens pitch L' of the cylindrical lenses 12 may be changed depending on the distance C between the autostereoscopic display apparatus and the viewer P. In such a case, the parallax image changer 22 changes the parallax images displayed on the two-dimensional display 11 based on the proper lens pitch L'. The horizontal pixel pitch px, the vertical pixel pitch py, the horizontal lens pitch Lx and the inclined angle θ fulfill the relational expressions represented by the formula (1) to the formula (5). Thus, line noise and unevenness of color are not easily caused even in the parallax images changed based on the proper lens pitch L'.

The parallax image changer 22 preliminarily computes the plural kinds of the parallax images S1 to S3 displayed on the two-dimensional display 11 with respect to assumed plural proper lens pitches L'. The parallax image changer 22 stores the computed parallax images S1 to S3 in the parallax image storage unit 36 in relation to the ranges of the assumed proper lens pitches L' as shown in FIG. 13(b). Accordingly, a computing load of frequent reconstructions of the parallax images according to the distance C measured by the distance measuring unit 21 can be reduced.

The parallax image changer 22 is not required to include the parallax image storage unit 36. In such a case, the parallax image changer 22 may frequently calculate the proper lens pitch L' depending on the distance C measured by the distance measuring unit 21, and reconstruct the parallax images displayed on the two-dimensional display 11 with respect to the calculated lens pitch L'. Accordingly, the correction of the parallax images according to the distance C can be carried out with higher accuracy.

The amount of change of the proper lens pitch L' in the third embodiment is 4 μm approximately equivalent to 0.5%, which is the amount of change of the lens pitch L when the parallax images are reconstructed in Example 1. Therefore, oblique line noise and unevenness of color are not caused in the reconstructed parallax images in the variation range of the proper lens pitch L' according to the distance C in the third embodiment.

Fourth Embodiment

In general, perspective and perception of stereoscopic viewing are different and subjective in each viewer P viewing an autostereoscopic display apparatus. Thus, the viewer P allows to select the most preferable parallax images among plural kinds of parallax images generated according to various lens parameters (the lens pitch L and the inclined angle θ of the cylindrical lenses 12). Then, parallax images to be subsequently displayed are generated based on the lens parameters by which the selected parallax images are obtained. As a result, a preferable stereoscopic image suitable for the viewer P and the viewing situation can be displayed.

An autostereoscopic display image in a fourth embodiment of the present invention will be explained, in which the most proper parallax images are selected by a viewer among plural kinds of parallax images corresponding to various lens pitches L and inclined angles θ so as to allow for subsequent proper stereoscopic image viewing.

Figure 15:
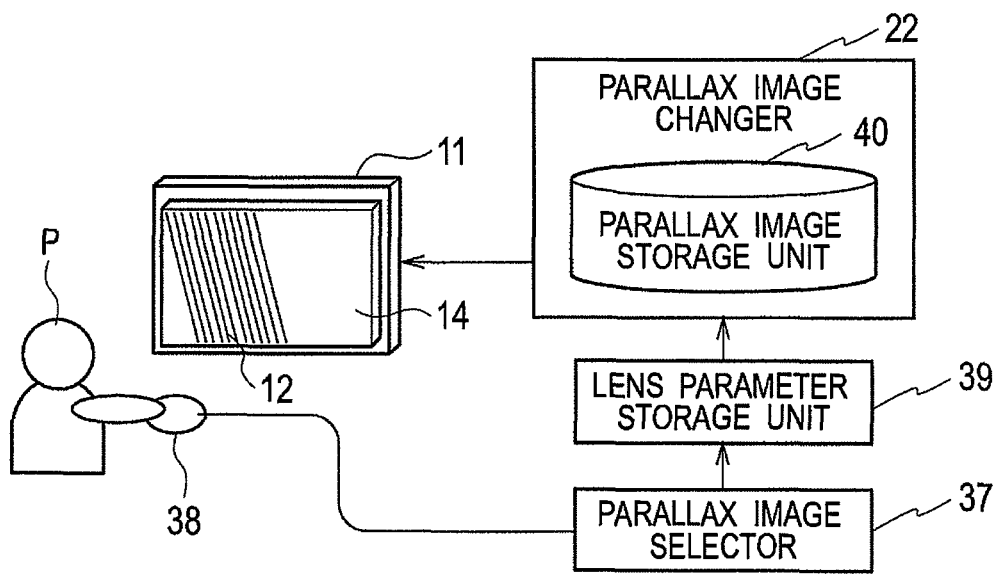
FIG. 15 is a block diagram showing an entire constitution of an autostereoscopic display apparatus according to a fourth embodiment of the present invention.

As shown in FIG. 15, the autostereoscopic display apparatus according to the fourth embodiment includes the two-dimensional display 11, the lenticular sheet 14 including the plural cylindrical lenses 12, a parallax image selector 37 that accepts parallax images selected by the viewer P among plural kinds of parallax images constructed based on plural lens pitches L of the cylindrical lenses 12 and plural inclined angles θ of the boundaries BL of the cylindrical lenses 12, a lens parameter storage unit 39 that stores the lens pitch L and the inclined angle θ corresponding to the parallax images accepted by the parallax image selector 37, and the parallax image changer 22 that changes parallax images displayed on the two-dimensional display 11 based on the lens pitch L and the inclined angle θ stored in the lens parameter storage unit 39. The constitutions of the two-dimensional display 11 and the lenticular sheet 14 are the same as those in the first embodiment, and the explanations thereof are thus not repeated.

The parallax image changer 22 includes a parallax image storage unit 40 that stores plural kinds of parallax images corresponding to the plural lens pitches L and the plural inclined angles θ. The parallax image storage unit 40 stores, for example, nine kinds of parallax images S1 to S9 corresponding to the combinations of the three lens pitches L and the three inclined angles θ as shown in FIG. 11(c). Note that the lens parameters are limited to the ranges not causing the oblique line noise as shown in FIG. 17(b) in the parallax images S1 to S9 to be generated.

The parallax image selector 37 accepts parallax images selected by the viewer P by use of a mouse 38 and a graphical user interface (GUI). For example, the nine kinds of the parallax images S1 to S9 shown in FIG. 11(c) are sequentially displayed on the two-dimensional display 11. The viewer P inputs the decision on the parallax images selected among the parallax images sequentially displayed by operating the mouse 38 when the parallax images allowing for the most proper stereoscopic image view are displayed. The decision by the viewer P may be input by a remote control operation.

The parallax image selector 37 accepts the parallax images, as the selected parallax images by the viewer P, being displayed when the parallax image selector 37 receives the decision input by the viewer P. The parallax image selector 37 displays the parallax images S1 to S9 repeatedly on the two-dimensional display 11 until the parallax image selector 37 receives the decision input by the viewer P. The method of selecting the parallax images by the viewer P is not limited to the above-described method. For example, the identification numbers of the parallax images S1 to S9 may also be displayed concurrently with the parallax images S1 to S9 sequentially displayed. Then, the viewer P may input one of the identification numbers. Alternatively, a digest of the parallax images S1 to S9 may be displayed on the two-dimensional display 11, so that the viewer P moves a cursor in any direction to select desired parallax images for the decision input.

The lens parameter storage unit 39 stores the lens pitch L and the inclined angle θ used to construct the parallax images accepted by the parallax image selector 37.

The parallax image changer 22 reads, from the parallax images S1 to S9 stored in the parallax image storage unit 40, the parallax images managed with the number identical to the lens parameter number showing the lens pitch L and the inclined angle θ stored in the lens parameter storage unit 39, and displays the read parallax images on the two-dimensional display 11. Alternatively, the parallax image changer 22 may frequently reconstruct the parallax images displayed on the two-dimensional display 11 according to the lens pitch L and the inclined angle θ stored in the lens pitch parameter storage unit 39. Accordingly, the parallax image changer 22 can generate the parallax images to be subsequently displayed based on the lens parameters (the lens pitch L and the inclined angle θ) by which the selected parallax images are obtained.

As described above, by allowing the viewer P to select the parallax images capable of the most proper stereoscopic image view, the lens pitch L and the inclined angle θ are changed to the most proper parameters including difference and subjectivity in perspective and perception of stereoscopic viewing of each viewer P, the viewing position, the production error and the temperature variation, so as to generate the parallax images to be subsequently displayed. The horizontal pixel pitch px, the vertical pixel pitch py, the horizontal lens pitch Lx and the inclined angle θ fulfill the relational expressions represented by the formula (1) to the formula (5). Therefore, the parallax images with less oblique line noise and unevenness of color even after changing the lens pitch L and the inclined angle θ can be displayed. Accordingly, fine stereoscopic images can be constantly obtained.

The autostereoscopic display apparatus according to the embodiments of the present invention includes the two-dimensional display including the color subpixels that are arranged in the horizontal direction and in the vertical direction, respectively, and the plural cylindrical lenses provided on the two-dimensional display to observe the color subpixels therethrough, and arranged parallel to each other. When Ax and Ay are relatively prime natural numbers, Ax is equal to or larger than two, and Bx is a minimum natural number by which a value GF indicated in the formula (2) represents an integer value, the horizontal pixel pitch px of the color subpixels, the vertical pixel pitch py of the color subpixels, the horizontal lens pitch Lx of the cylindrical lenses, and the inclined angle θ of the boundaries of the cylindrical lenses to the vertical direction satisfy the relational expressions represented by the formula (1) to the formula (3). The autostereoscopic display apparatus further includes the temperature sensor that measures the ambient temperature of the cylindrical lenses, and the parallax image changer that changes the parallax images according to the ambient temperature measured by the temperature sensor. Therefore, it is possible to prevent a generation of line noise even when the lens pitch and the inclined angle of the cylindrical lenses are changed from the initial values, and the parallax images are changed in accordance with the change of the lens pitch and the inclined angle. Thus, the autostereoscopic display apparatus according to the embodiments of the present invention is industrially applicable.

What is claimed is:

1. An autostereoscopic display apparatus for displaying an image segmented into plural parallax images in a horizontal direction, the apparatus comprising:
   a two-dimensional display including color subpixels that are arranged in a horizontal direction and in a vertical direction, respectively;
   a plurality of cylindrical lenses provided on the two-dimensional display to observe the color subpixels therethrough, and arranged parallel to each other,
   a temperature sensor configured to measure an ambient temperature of the cylindrical lenses; and
   a parallax image changer configured to change the parallax images based on the ambient temperature measured by the temperature sensor,
   wherein when a pixel pitch of the color subpixels in the horizontal direction is defined as px, a pixel pitch of the color subpixels in the vertical direction is defined as py, a lens pitch of the cylindrical lenses in the horizontal direction is defined as Lx, an inclined angle of boundaries of the cylindrical lenses to the vertical direction is defined as θ, Ax and Ay are relatively prime natural numbers, Ax is equal to or larger than two, and Bx is a minimum natural number by which a value GF indicated in the formula (2) represents an integer value, $$\theta = \arctan\{(Ax \cdot px)/(Ay \cdot py)\} \qquad (1)$$

$$GF = Bx \cdot Lx/px \qquad (2)$$

$$Ay \geq Bx \geq 2 \text{ and } Ax \geq 2 \qquad (3)$$

px, py, Lx and θ satisfy relational expressions represented by the formula (1) to the formula (3).

2. The autostereoscopic display apparatus according to claim 1, wherein the parallax image changer includes a parallax image storage unit configured to store plural ambient temperatures and plural kinds of parallax images corresponding to the plural ambient temperatures in relation to each other, and
   the parallax image changer selects parallax images corresponding to the ambient temperature measured by the temperature sensor with reference to the parallax image storage unit, and displays the selected parallax images on the two-dimensional display.

3. The autostereoscopic display apparatus according to claim 1, wherein the parallax image changer determines an amount of expansion and contraction of the lens pitch of the cylindrical lenses based on the ambient temperature measured by the temperature sensor, reconstructs parallax images based on the amount of expansion and contraction of the lens pitch, and displays the reconstructed parallax images on the two-dimensional display.

4. The autostereoscopic display apparatus according to claim 1, wherein in the two-dimensional display, when the color subpixels of D kinds of different colors are periodically arranged in the horizontal direction, the color subpixels of identical colors are arranged in the vertical direction, D is a natural number equal to or larger than three, and α and β, by which GH in the formula (5) represents a minimum value, among natural numbers α and β satisfying the formula (4) are defined as $\alpha_0$ and $\beta_0$, $$\alpha \cdot px + \beta \cdot py \cdot \tan\theta = Lx \tag{4}$$

$$GH = (\alpha \cdot px)^2 + (\beta \cdot py)^2 \tag{5}$$

$\alpha_0$ is not a multiple of D.

5. An autostereoscopic display apparatus for displaying an image segmented into plural parallax images in a horizontal direction, the apparatus comprising:
   a two-dimensional display including color subpixels that are arranged in a horizontal direction and in a vertical direction, respectively;
   a plurality of cylindrical lenses provided on the two-dimensional display to observe the color subpixels therethrough, and arranged parallel to each other,
   a production error storage unit configured to store a production error of a lens pitch of the cylindrical lenses and a production error of an inclined angle of boundaries of the cylindrical lenses; and
   a parallax image changer configured to change the parallax images based on the production errors stored in the production error storage unit,
   wherein when a pixel pitch of the color subpixels in the horizontal direction is defined as px, a pixel pitch of the color subpixels in the vertical direction is defined as py, the lens pitch of the cylindrical lenses in the horizontal direction is defined as Lx, the inclined angle of the boundaries of the cylindrical lenses to the vertical direction is defined as θ, Ax and Ay are relatively prime natural numbers, Ax is equal to or larger than two, and Bx is a minimum natural number by which a value GF indicated in the formula (2) represents an integer value, $$\theta = \arctan\{(Ax \cdot px)/(Ay \cdot py)\} \tag{1}$$

$$GF = Bx \cdot Lx/px \tag{2}$$

$$Ay \geq Bx \geq 2 \text{ and } Ax \geq 2 \tag{3}$$

px, py, Lx and θ satisfy relational expressions represented by the formula (1) to the formula (3).

6. The autostereoscopic display apparatus according to claim 5, wherein the parallax image changer includes a parallax image storage unit configured to store plural production errors and plural kinds of parallax images corresponding to the plural production errors in relation to each other, and
   the parallax image changer selects parallax images corresponding to the production errors stored in the production error storage unit with reference to the parallax image storage unit, and displays the selected parallax images on the two-dimensional display.

7. The autostereoscopic display apparatus according to claim 5, wherein the parallax image changer reconstructs parallax images based on the production errors stored in the production error storage unit, and displays the reconstructed parallax images on the two-dimensional display.

8. An autostereoscopic display apparatus for displaying an image segmented into plural parallax images in a horizontal direction, the apparatus comprising:
   a two-dimensional display including color subpixels that are arranged in a horizontal direction and in a vertical direction, respectively;
   a plurality of cylindrical lenses provided on the two-dimensional display to observe the color subpixels therethrough, and arranged parallel to each other,
   a distance measuring unit configured to measure a distance between the cylindrical lenses and a viewer; and
   a parallax image changer configured to change the parallax images based on the distance measured by the distance measuring unit,
   wherein when a pixel pitch of the color subpixels in the horizontal direction is defined as px, a pixel pitch of the color subpixels in the vertical direction is defined as py, a lens pitch of the cylindrical lenses in the horizontal direction is defined as Lx, an inclined angle of boundaries of the cylindrical lenses to the vertical direction is defined as θ, Ax and Ay are relatively prime natural numbers, Ax is equal to or larger than two, and Bx is a minimum natural number by which a value GF indicated in the formula (2) represents an integer value, $$\theta = \arctan\{(Ax \cdot px)/(Ay \cdot py)\} \tag{1}$$

$$GF = Bx \cdot Lx/px \tag{2}$$

$$Ay \geq Bx \geq 2 \text{ and } Ax \geq 2 \tag{3}$$

px, py, Lx and θ satisfy relational expressions represented by the formula (1) to the formula (3).

9. The autostereoscopic display apparatus according to claim 8, wherein the parallax image changer calculates a proper lens pitch of the cylindrical lenses based on the distance measured by the distance measuring unit,
   the parallax image changer includes a parallax image storage unit configured to store plural proper lens pitches and plural kinds of parallax images corresponding to the plural proper lens pitches in relation to each other, and
   the parallax image changer selects parallax images corresponding to the calculated proper lens pitch with reference to the parallax image storage unit, and displays the selected parallax images on the two-dimensional display.

10. The autostereoscopic display apparatus according to claim 8, wherein the parallax image changer calculates a proper lens pitch of the cylindrical lenses based on the distance measured by the distance measuring unit, reconstructs parallax images based on the calculated proper lens pitch, and displays the reconstructed parallax images on the two-dimensional display.

11. An autostereoscopic display apparatus for displaying an image segmented into plural parallax images in a horizontal direction, the apparatus comprising:
   a two-dimensional display including color subpixels that are arranged in a horizontal direction and in a vertical direction, respectively;
   a plurality of cylindrical lenses provided on the two-dimensional display to observe the color subpixels therethrough, and arranged parallel to each other,
   a parallax image selector configured to accept parallax images selected by a viewer among plural kinds of parallax images constructed based on plural lens pitches of the cylindrical lenses and plural inclined angles of boundaries of the cylindrical lenses;

a lens parameter storage unit configured to store the lens pitch and the inclined angle corresponding to the parallax images accepted by the parallax image selector; and a parallax image changer configured to change the parallax images based on the lens pitch and the inclined angle stored in the lens parameter storage unit, wherein when a pixel pitch of the color subpixels in the horizontal direction is defined as px, a pixel pitch of the color subpixels in the vertical direction is defined as py, the lens pitch of the cylindrical lenses in the horizontal direction is defined as Lx, the inclined angle of the boundaries of the cylindrical lenses to the vertical direction is defined as $\theta$, Ax and Ay are relatively prime natural numbers, Ax is equal to or larger than two, and Bx is a minimum natural number by which a value GF indicated in the formula (2) represents an integer value, $$\theta = \arctan\{(Ax \cdot px)/(Ay \cdot py)\} \quad (1)$$

$$GF = Bx \cdot Lx/px \quad (2)$$

$$Ay \geq Bx \geq 2 \text{ and } Ax \geq 2 \quad (3)$$

px, py, Lx and $\theta$ satisfy relational expressions represented by the formula (1) to the formula (3).

\* \* \* \* \*